United States Patent
Kirschey

(10) Patent No.: US 7,458,896 B2
(45) Date of Patent: Dec. 2, 2008

(54) ELASTIC SHAFT COUPLING

(75) Inventor: Gerhard Kirschey, Wuppertal (DE)

(73) Assignee: Centa-Antriebe Kirschey GmbH, Haan (DE)

( * ) Notice: Subject to any disclaimer, the term of this patent is extended or adjusted under 35 U.S.C. 154(b) by 213 days.

(21) Appl. No.: 11/079,935

(22) Filed: Mar. 10, 2005

(65) Prior Publication Data

US 2005/0202880 A1 Sep. 15, 2005

(30) Foreign Application Priority Data

Mar. 13, 2004 (DE) .................. 10 2004 012 396

(51) Int. Cl.
*F16D 3/00* (2006.01)
*F16D 1/06* (2006.01)

(52) U.S. Cl. ............................. 464/92; 403/1
(58) Field of Classification Search .............. 464/70, 464/71, 85, 87, 88, 92, 98, 137; 403/1, 191, 403/195, 234, 236, 261; 411/538, 517, 531
See application file for complete search history.

(56) References Cited

U.S. PATENT DOCUMENTS

| | | | | |
|---|---|---|---|---|
| 1,483,561 A | * | 2/1924 | Ungar | 464/70 |
| 1,540,096 A | * | 6/1925 | West | 74/450 |
| 2,083,609 A | * | 6/1937 | Lefevre | |
| 2,122,838 A | | 7/1938 | Guy | |
| 2,754,667 A | * | 7/1956 | Boschi | 464/87 |
| 3,296,827 A | * | 1/1967 | Landon, Jr. et al. | 464/92 |
| 3,683,643 A | * | 8/1972 | Kirschey | 464/92 |
| 3,698,208 A | * | 10/1972 | Williams | 464/92 |
| 3,724,239 A | * | 4/1973 | Calistrat | 464/92 |
| 4,385,896 A | * | 5/1983 | Borda | 464/71 |
| 5,286,231 A | | 2/1994 | Zilbermann | |
| 5,976,662 A | * | 11/1999 | Pollard et al. | |
| 6,500,071 B1 | * | 12/2002 | Pollard | 464/69 |
| 2004/0018880 A1 | * | 1/2004 | Kayamoto | |

FOREIGN PATENT DOCUMENTS

| | | |
|---|---|---|
| CH | 279 158 | 3/1952 |
| DE | 2 019 608 | 12/1971 |
| DE | 2 254 078 | 8/1973 |

OTHER PUBLICATIONS

Bolt Science. Glossary on Terminology related to Nuts and Bolts, [Online], [retrieved on Apr. 7, 2007]. retrieved from internet <URL: http://www.boltscience.com/pages/glossary.htm>.*

* cited by examiner

*Primary Examiner*—Victor MacArthur
(74) *Attorney, Agent, or Firm*—Andrew Wilford

(57) ABSTRACT

An elastic shaft coupling for interconnecting a driving member and a driven member for joint rotation of the members about a generally common axis has an annular coupling element of elastic material between the driving and driven members and a plurality of angularly spaced metal bodies incorporated in the coupling element and provided with respective bores. Fastening screws extend through the bores and are threaded into the members so that the members are rotationally interconnected by the coupling element. One of the metal bodies is formed of two separate segments separated by a throughgoing split and also form an annular and axially open groove extending across the split. The coupling element can be spread at the split. A ring extends angularly across the split and fitted to and recessed in the groove.

12 Claims, 4 Drawing Sheets

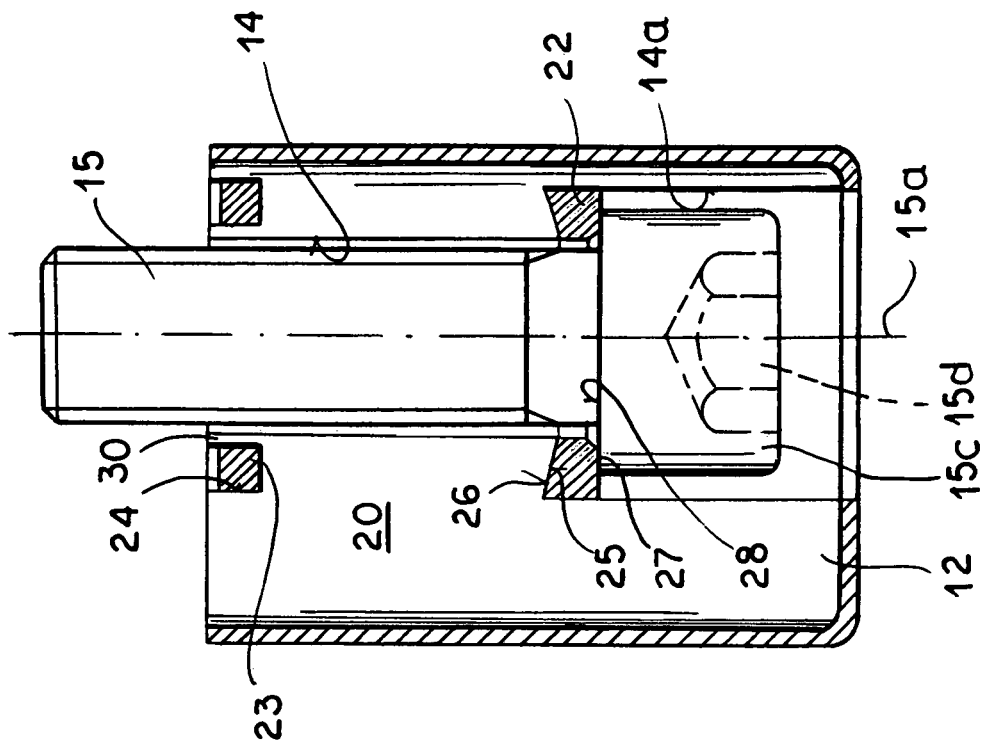
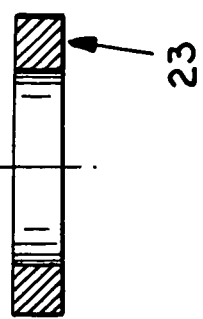
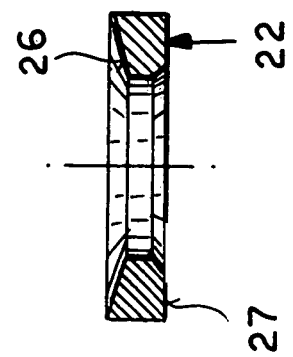

ELASTIC SHAFT COUPLING

FIELD OF THE INVENTION

My present invention relates to an elastic shaft coupling and, more particularly, to a shaft coupling of the type in which an elastomeric body is provided between the driving and driven coupling halves or between the driving and driven members of the shaft coupling which are connected respectively to the driving and driven shafts.

BACKGROUND OF THE INVENTION

One type of elastic shaft coupling has, between a driving and a driven coupling half or coupling member, a substantially ring-shaped or annular coupling element composed of elastic material, usually an elastomer and especially rubber, whereby, for connection of that coupling element or body with the coupling halves or the driving and driven members of the coupling which are connected to the respective shafts, metallic members are embedded in, connected by vulcanization to, or otherwise form parts of the elastic body.

These metal members are provided with bores traversed by fastening screws which can be threaded into the respective coupling halves or connected thereto by bolt and nut connections.

The coupling elements or bodies itself can be split in the region of one of the metal parts and through the segments formed by the split metal parts. Fastening screws and at least one fixing device held by the fastening screw can retain the coupling closed at the split.

An elastic shaft coupling of this type is known from the catalog entitled "KOP-FLEX ELASTOMERIC™ Couplings", page 96 of the firm KOP-FLEX INC., Harmans Road, Harmans, Md. 21077. This elastic coupling comprised basically of a polygonal annular body of rubber into which at uniformly spaced or equispaced relationship metal parts or so-called inserts have been vulcanized. These metal parts are extended in the axial direction of the coupling beyond the annular body and thereby form axial projections extending alternately in one and the other axial direction and parallel to the longitudinal or rotation axis of the coupling system. The metal parts have a generally wedge shape, i.e. a cross section which tapers toward the axis of rotation and engage in matching wedge-shaped grooves in the peripheries of two hubs which form the coupling together with that elastic body. The hubs are the driven and driving members of the coupling. Each of the metal parts, of which one is split into two segments, has a radially extending stepped bore to receive a respective fastening screw which is threaded into the respective hub. The underside of the head of the screw then presses against the step of the stepped bore so that each metal part is drawn into or pressed into the respective wedge-shaped groove of the respective hub. The wedge and groove arrangement form together with the respective fastening screw a fixing device which, in the case of the segmented metal part holds the two segments securely together and the ring closed. To open the ring, the system must be disassembled and such openings and disassembly is not possible without enabling the assembly to shift or move in the axial direction. An axial movement is necessary as well for reassembly or mounting.

This advantage of the prior art coupling can be obtained only with relatively high cost and the need to provide at each side of the coupling a respective hub as the connector for the coupling ring.

DE 2 019 608 C describes an elastic shaft coupling of which a million have been marketed and which also provides a polygonal annular body of elastic material, like rubber, in which metal bodies have been vulcanized at uniformly-spaced intervals. These metal bodies are alternately of different configuration so that the bores for the screws which traverse them are alternately oriented in the axial and the radial direction. In this manner it is possible to have the axially oriented fastening screws threaded into a planar surface such as that of a flange constituting or forming part of one coupling half. The radially oriented fastening screws can be threaded into a cylindrical outer surface of the other coupling half. This construction provides the advantages of the arrangement previously described and in addition an advantage in that it allows the coupling halves to be free from any special feature. Other than the threaded bores for receiving the fastening screws, the system can be provided between a flanged member and one having a cylindrical attachment surface. In this arrangement as well, however, it is not possible to mount or dismount the coupling ring without shifting the system to a certain extent in the axial direction.

OBJECTS OF THE INVENTION

It is, therefore, the principal object of the present invention to provide an elastic coupling which is of as simple and economical construction as possible and which can be mounted and dismounted without axial shifting of the system.

Another object of the invention is to provide an elastic shaft coupling which can be used between a flanged member and a member having a cylindrical surface, i.e. which does not require two hub-shaped members as was the case with earlier systems.

Yet another object of this invention is to provide an elastic shaft coupling with advantages of the two systems previously described but without some of the drawbacks thereof which have been enumerated.

Still another object of this invention is to provide an improved highly effective, easily mounted and dismounted elastic shaft coupling which is free from drawbacks of earlier systems.

SUMMARY OF THE INVENTION

These objects and others which will become apparent hereinafter are attained, in accordance with the invention in an elastic shaft coupling comprising:

a driving member and a driven member spaced apart along an axis of rotation of the members;

a substantially annular coupling element of an elastic material between the driving and driven members;

angularly spaced metal bodies incorporated in the element and provided with respective bores traversed by fastening screws threaded into the members, the coupling element and at least one of the metal bodies being split whereby the one of the metal bodies has respective segments separated by a split and connected to opposite sides of a split running through the element; and a fixing device juxtaposed substantially exclusively with the one of the bodies and a respective one of the fastening screws for retaining the split in the one of the metal bodies in a substantially closed position for operation of the shaft coupling.

In accordance with the invention, therefore, the shaft coupling has at least one fixing device which is juxtaposed substantially exclusively with the split metal body, i.e. the two segments on opposite sides of the split or gap. Especially it is a feature of this invention that the fixing device be located segments on opposite sides of the split or gap. Especially it is a feature of this invention that the fixing device be located completely in the split metal body and the two segments thereof itself.

The elastic shaft coupling of the invention, therefore, has all of the advantages of the couplings previously described without the drawback that an axial shift is required for mounting and dismounting the assembly. The integration of the fixing device into the split metal body itself requires no special configuration of the hub or flange to which the elastic element is connected and the result is a coupling generally similar to that of DE 2 019 608 C but which can be mounted and dismounted more simply and without requiring an axial shift. A standard coupling of latter type, especially in case of failure can be replaced by a coupling in accordance with this invention with all of the advantages mentioned.

According to a feature of the invention the fixing device is a clamping ring traversed by the one of the fastening screws and having an inclined surface bearing upon inclined partial surfaces of the segments to draw the segments together and urge the segments against a respective one of the members into which the one of the screws is threaded.

The inclined surfaces on the clamping ring and on the segment thus serves to wedge the two segments toward one another across the gap and to draw the gap into its substantially closed position.

Alternatively the centering device is a centering ring received in grooves of the segments and holding the segments in a closed position.

The grooves of the segments can together form an annular groove in the split body which opens toward the member into which the screw traversing the ring is threaded.

Preferably both rings are provided in the split body and the fixing device then comprises:

a clamping ring traversed by the one of the fastening screws and having an inclined surface bearing upon inclined partial surfaces of the segments to draw the segments together and urge the segments against a respective one of the members into which the one of the screws is threaded, and a centering ring traversed by the one of the screws and received in grooves of the segments.

One of the rings can form a washer underlying the head of the screw.

An elastic coupling with the features of the present invention preferably has the splits or gap in the metal body lying in a radial plane which runs parallel to the axis of rotation of the coupling. The split in the middle body forming the segment can subdivide that body into two mirror-symmetrical halves.

The fixing device formed by one or both of the rings is preferably traversed by a screw which is perpendicular to the surface into which the screw is threaded, preferably of a flange which lies in a plane perpendicular to the axis of rotation, although the screw traversing the fixing device can also be a radial screw if desired.

A precondition for the invention is that one of the metal bodies be split in the manner described. This does not, however, exclude the possibility that two or more of the metal bodies may also be split and have corresponding fixing devices.

The split can be formed in conjunction with the fabrication of the elastic element and the metal bodies can be fully formed prior to vulcanization in the metal bodies. The coupling of the invention can then use as a starting point an original coupling according to DE 2 019 608 C, i.e. a CENTAFLEX® coupling of the assignee of the present application and which differs there from in their metal bodies and preferably only in the one of the metal bodies or such metal bodies as are split and in the annular grooves and inclined flanks or surfaces fo the grooves and of the rings.

When the metal body is formed with annular grooves and machined to have the inclined surfaces, it can be cut through or split to separate that body into the segments.

According to the invention it is also possible although not compulsory to form the split in the elastic element and in at least one of the metal bodies incorporated therein after vulcanization of the bodies in the coupling ring to enable the latter to be opened.

BRIEF DESCRIPTION OF THE DRAWING

The above and other objects, features, and advantages will become more readily apparent from the following description, reference being made to the accompanying drawing in which:

FIG. 5 is a cross sectional view through the region of the fixing device of the embodiment of FIG. 2, again drawn to a larger scale;

FIG. 6 is a cross sectional view of the centering ring used in the system shown in FIGS. 3 and 4; and FIG. 7 is a cross sectional view through the clamping ring of these Figures.

SPECIFIC DESCRIPTION

Figure 1:
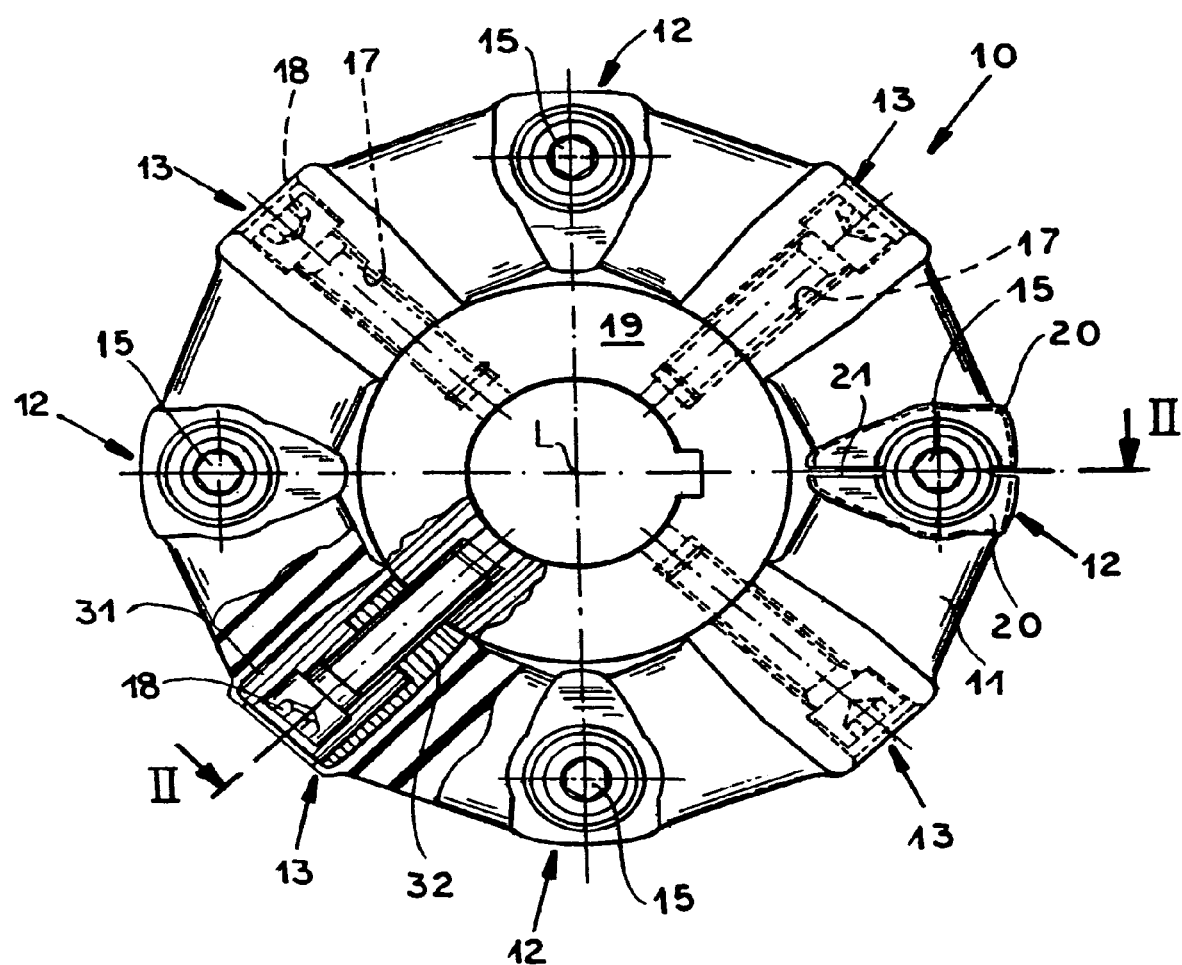
FIG. 1 is an elevational view, partly broken away showing the annular elastic element according to the invention and wherein at the left and right hand sides of the drawing two different embodiments have been illustrated.

In the drawing I have shown an elastic shaft coupling which as a whole is represented at 10. The shaft coupling 10 comprises substantially a polygonal ring element 11, preferably of an elastomer and especially of rubber, into which at uniform angular spacing, metal bodies 12 and 13 are anchored by vulcanizing them to the rubber. The different metal bodies 12 and 13 alternate angularly about the coupling 10 from one to another.

The metal bodies 12 have throughgoing bores 14, the centers of which all lie along the same cylinder centered on the longitudinal or rotation axis L of the shaft coupling. The throughgoing bores 14 are traversed by fastening screws 15 whose longitudinal axes 15a (FIG. 2) run parallel to the rotation axis L which also may be referred to here as the longitudinal axis of the coupling system. The fastening screws 15 serve to affix the elastic body to one of two coupling halves or members, i.e. the driving member or the driven member which is provided as a flange 16 and which can be connected via its bore 16a and keyway 16b with a respective shaft, e.g. that of a diesel engine. The coupling half or member is represented at 16c and is in this case the driving member. The fastening screw 15 has a threaded shank 15b, a cap head 15c and a socket 15d into which an Allen wrench can be inserted. The socket 15d can be reached by the Allen wrench through a counterbore 14a of greater diameter than the bore 14 through which the respective screw 15 passes and aligned along the axis 15a with the respective internally threaded bore 16d in the flange 16.

The metal bodies 13 alternating with the bodies 12 have throughgoing radial bores 17 which receive the fastening screws 18 threaded into radial bores 19a of a hub 19 which can be mounted by an axial bore 19b and a keyway 19c on the shaft of an apparatus driven by the diesel engine. From FIGS. 1 and 2 it will be apparent that the bodies 13 can be composed of two members 31 and 32 which interf it with one another.

In general terms as to the construction already described, reference can be made to the aforementioned DE 2 019 608C. Using the fastening screws 15 and 18, the elastic body 11 can be affixed to the driving and driven parts and can be attached there from. In the past, however, this has required some axial displacement so that room had to be left in the axial direction for the assembly and disassembly of the coupling to eliminate this drawback, according to the invention, one of the metal bodies 12 (or 13 or both) is split in such manner that two substantially mirror-symmetrical or complementary-shaped metal segments are provided on opposite sides of the split. The split can extend through the entire radial width of the ring 11 so that the two ends of the ring defined by the split can be separated from one another to enable the ring 11 to be removed without axial shifting of the unit.

At the right hand side of FIG. 1 the metal body 12 has been shown to be split to form the two mirror-symmetrical segments 20 which are separated by a gap 21 from one another. When the screw 15 is removed from this body, the ends of the ring formed by the split can be spread apart to allow this open end of the ring to be drawn off radially in a plane parallel to the plane of the paper in FIG. 1 over the hub 19.

Since the segments 20 do not interfit, a fixing device is provided to hold the segments together and the split substantially closed during operation of the coupling. The fixing device comprises two disk-shaped rings 22 and 23, either of which can be a washer against which the head of the screw bears.

FIGS. 5-7 illustrate the fixing device in greater detail.

The fixing device can comprise a clamping ring 22 and/or a centering ring 23.

The centering ring 23 is formed as a flat washer with a rectangular cross section through the ring 23. To receive the centering ring 23, the two segments 20 in their surfaces facing the flange 16 are formed with semicircular grooves halves opening toward the flange 16 and together forming an annular groove 24 into which the ring 23 is set to hold the two segments 20 together and the split 21 closed. The ring 23 is traversed by the screw 15 and is held thereby against the flange 16. The ring 23 can thus be pressed axially against the flange 16 or merely captured in the groove 24 until the screw 15 is removed as may be desired.

Figure 2:
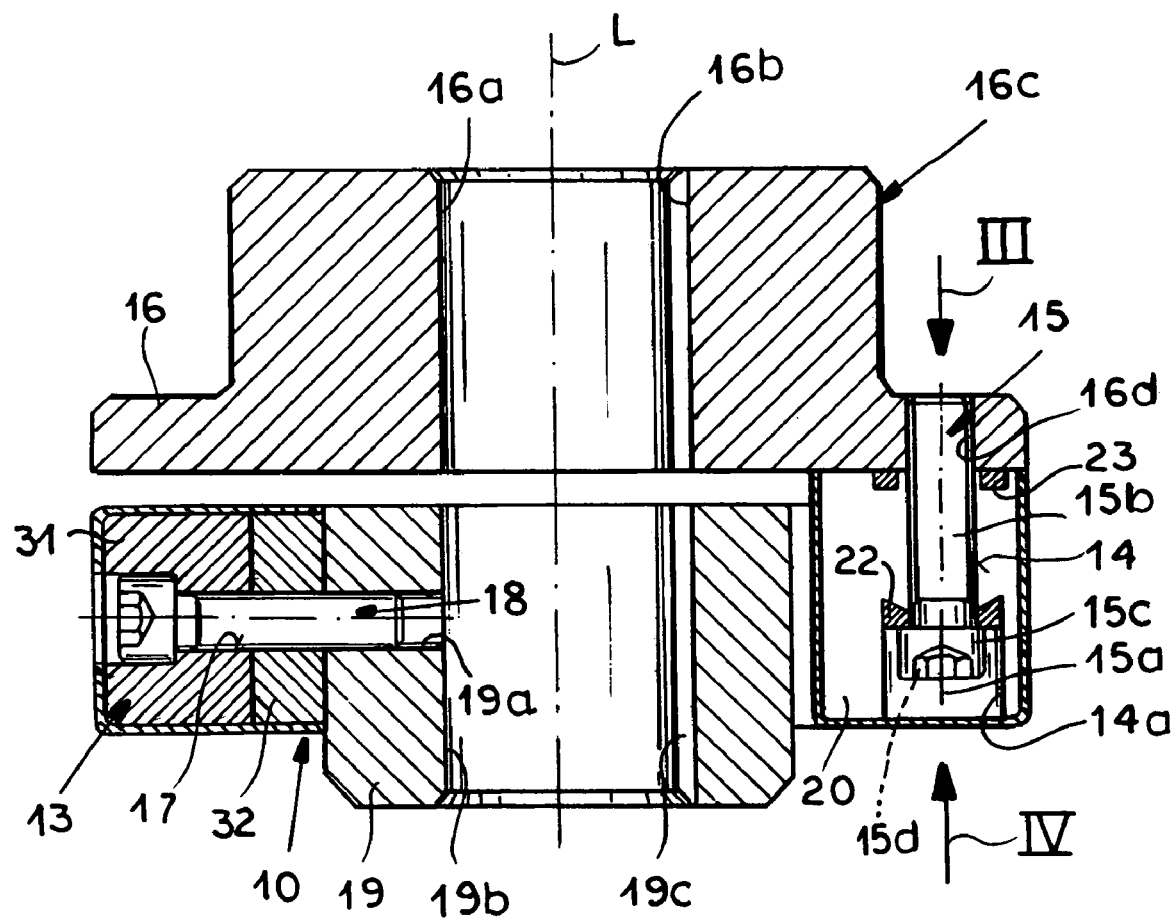
FIG. 2 is a cross sectional view taken along the line II-II of FIG. 1.

As can be seen from FIG. 5 as well as from FIG. 2 the annular groove 24 here opens toward the free end of the shank of screw 15, which end is threaded into the bore 16d of the flange 16.

To receive the clamping ring 22, the two metal segments 20 are provided with inclined flanks 25 together forming an annular frustoconical surface subdivided by the split 21 and juxtaposed with a correspondingly frustoconical annular surface 26 of the ring 22 (FIGS. 5 and 7). As these Figures also show, the opposite surface 27 of the clamping ring 22 is planar and perpendicular to the axis 15a of the screw 15 to abut the planar underside 28 of the head 15c of that screw 15, which is provided with the hexagonal socket 15d as described in connection with FIG. 2.

The frustoconical surfaces 25, 26 produce a wedge action as the screw 15 is tightened, to draw the segments 20 toward one another and hold the split 21 in its closed state. The clamping ring 22, whose periphery lies against the inner wall of the bore 14 defined in the segments 20 provides a centering function for the segments 20.

In addition, a centering ring 23 can be provided in the segments 20 proximal to the member into which the screw is threaded, here the flange 16. The centering ring 23 can be provided independently of the clamping ring 22 but preferably is provided in addition thereto. Such centering rings as shown at 23 can be provided in place of the clamping ring 22 and conversely, a clamping ring 22 can be provided in place of the rectangular-section ring 23 remote from the head 29 to engage inclined surfaces of the segments close to the flange 16.

While an important feature of the invention is the fact that the clamping ring can draw the segments together, this is not as important as the fact that the clamping ring 22 or clamping rings 22 when two are provided, and the centering ring 23 serve to hold the segments together and during operation cannot move from their fixed positions.

The coupling which results thus has the advantages of the coupling described in DE 2 109 608 C in that upon withdrawal of the screws, the split can open and the elastic ring drawn off the hub 19 radially but with the additional advantage that no axial displacement is required. When the ring or rings 22, 23 are in place, the gap is maintained closed. The groove 24 and the inclined surface 25 can be machined in the respective metal part 12 before the latter is cut into the two segments by the formation of the split 21.

Figure 3:
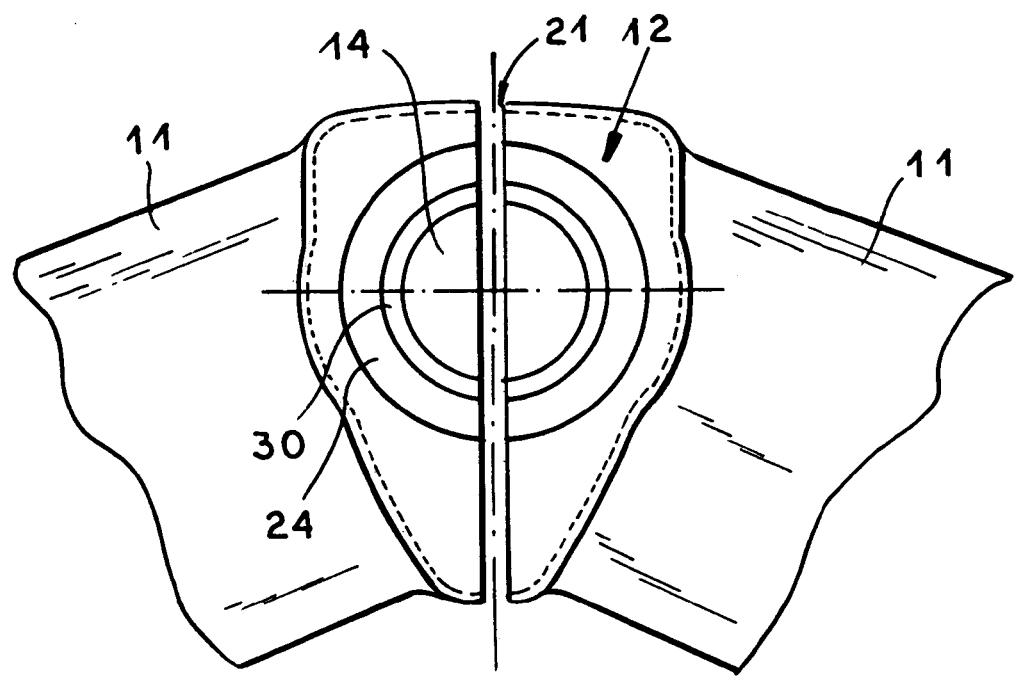
FIG. 3 is a detail elevation to an enlarged scale in the direction of the arrow III of FIG. 2.
Figure 4:
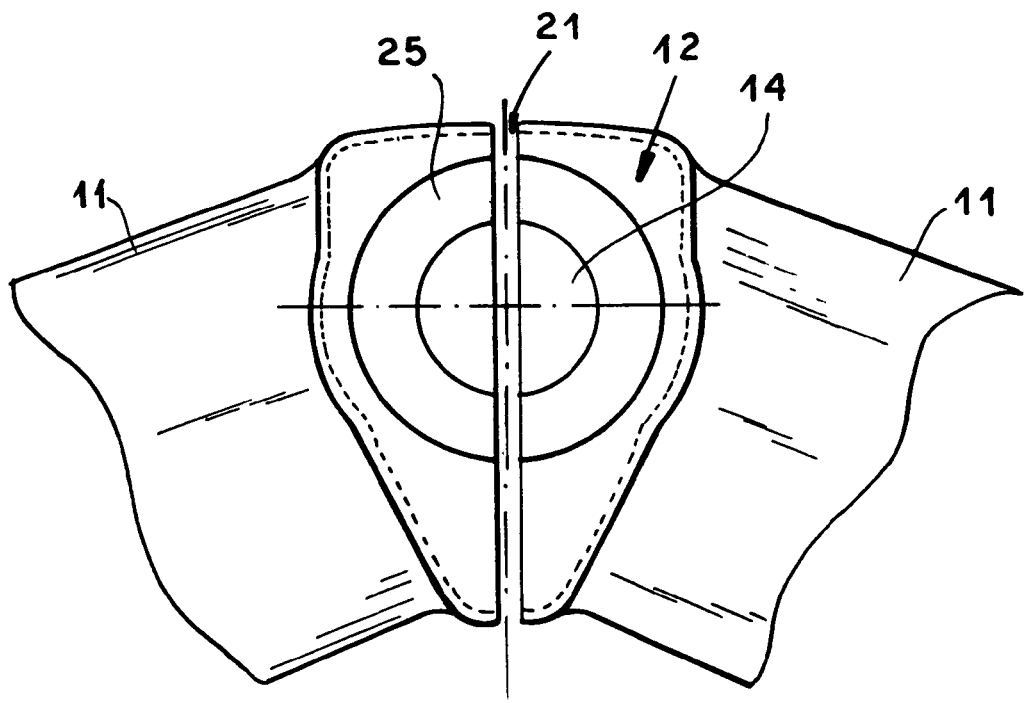
FIG. 4 is a view in the direction of the arrow IV of FIG. 2 of a detail, also to a larger scale.

In FIGS. 3 and 4 the annular surfaces against which the rings engage have been shown in greater detail with the split 22 already indicated. As far as the annular groove 24 is concerned, it is separated from the bore 14 (FIG. 5) by an annular flange 30 which is surrounded by the ring 23 so that this ring exerts both an internal and an external centering function. The annular groove 24 is also open toward the flange 16 so that upon assembly of the coupling, the centering ring can be inserted into the groove.

The clamping ring 22 also functions like a washer received in the large diameter portion 14a of the stepped bore 14, 14a.

The elastic ring 12 can have two or more splits, enabling it to be assembled or disassembled in segments. It should be noted further that neither the flange 16 nor the hub 19, except for being provided with the threaded bores to receive the screws, participates in the gap closing action for the annular elastic member 12.

I claim:

1. An elastic shaft coupling for interconnecting a driving member and a driven member for joint rotation of the members about a generally common axis, the coupling comprising:
    an annular coupling element of elastic material between the driving and driven members;
    a plurality of angularly spaced metal bodies incorporated in the element and provided with respective bores;
    fastening screws extending through the bores and threaded into the members, whereby the members are rotationally interconnected through the coupling element, one of the metal bodies being formed of two separate segments separated by a throughgoing split and forming a groove extending across the split and having a pair of annular walls either meeting at an angle of less than 90° or extending substantially parallel to each other, whereby the coupling element can be spread at the split; and
    a fixing device extending angularly across the split and fitted to and recessed in the groove.

2. The elastic shaft coupling defined in claim 1 wherein said annular coupling element is composed of a rubber and said metal bodies are vulcanized to the rubber.

3. The elastic shaft coupling defined in claim 1 wherein said fixing device is a clamping ring traversed by said one of said fastening screws and having an inclined surface bearing upon inclined partial surfaces of said segments to draw said segments together and urge said segments against a respective one of said members into which said one of said screws is threaded.

4. The elastic shaft coupling defined in claim 1 wherein said fixing device comprises:
   a clamping ring traversed by said one of said fastening screws and having an inclined surface bearing upon inclined partial surfaces of said segments to draw said segments together and urge said segments against a respective one of said members into which said one of said screws is threaded, and
   a centering ring traversed by said one of said screws and received in grooves of said segments.

5. The elastic shaft coupling defined in claim 1 wherein said fixing device comprises at least one of:
   a clamping ring traversed by said one of said fastening screws and having an inclined surface bearing upon inclined partial surfaces of said segments to draw said segments together and urge said segments against a respective one of said members into which said one of said screws is threaded, and
   a centering ring traversed by said one of said screws and received in grooves of said segments, said centering ring forming a washer underlying a head of said one of said fastening screws.

6. The elastic shaft coupling defined in claim 1 wherein said fixing device includes a centering ring traversed by said one of said screws and received in grooves of said segments, said grooves opening toward said one of said members into which said one of said screws is threaded.

7. The elastic shaft coupling defined in claim 1 wherein said split in said one of said bodies lies in a radial plane parallel to the axis.

8. The elastic shaft coupling defined in claim 1 wherein said split in said one of said bodies subdivides said one of said bodies into two mirror symmetrical halves forming said segments.

9. An elastic shaft coupling for interconnecting a driving member and a driven member for joint rotation of the members about a generally common axis, the coupling comprising:
   an annular coupling element of elastic material between the driving and driven members;
   a plurality of angularly spaced metal bodies incorporated in the coupling element and provided with respective bores;
   fastening screws extending through the bores and threaded into the members, whereby the members are rotationally interconnected through the coupling element, one of the metal bodies being formed of two separate segments separated by a throughgoing split and forming an annular and axially open groove extending across the split and having a pair of annular walls either meeting at an angle of less than 90° or extending substantially parallel to each other, whereby the coupling element can be spread at the split; and
   a ring extending angularly across the split and fitted to and recessed in the groove.

10. The elastic shaft coupling defined in claim 9 wherein the groove is generally circular and has inner and outer flanks, the ring fitting snugly in the groove.

11. The elastic shaft coupling defined in claim 10 wherein the groove has a floor of frustoconical shape tapering such that the groove is deeper at the outer flank than at the inner flank, the ring having a complementarily shaped frustoconical end face, whereby axially pressing the ring into the groove closes the split.

12. The elastic shaft coupling defined in claim 9 wherein at least two of the bodies are formed of segments defining splits and grooves, there being two such rings fittable to the grooves to hold the coupling together.

* * * * *